(12) United States Patent
Dewaele

(10) Patent No.: US 6,792,071 B2
(45) Date of Patent: Sep. 14, 2004

(54) METHOD OF PERFORMING GEOMETRIC MEASUREMENTS ON DIGITAL RADIOLOGICAL IMAGES

(75) Inventor: Piet Dewaele, Berchem (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 10/389,835

(22) Filed: Mar. 17, 2003

(65) Prior Publication Data

US 2003/0194057 A1 Oct. 16, 2003

Related U.S. Application Data

(60) Provisional application No. 60/371,554, filed on Apr. 10, 2002.

(30) Foreign Application Priority Data

Mar. 27, 2002 (EP) .......................................... 02100307

(51) Int. Cl.[7] .......................................... G01N 23/083
(52) U.S. Cl. .......................... 378/62; 378/51; 378/98.2
(58) Field of Search .............................. 378/8, 901, 51, 378/62, 98.2, 98.8

(56) References Cited

U.S. PATENT DOCUMENTS 5,832,103 A * 11/1998 Giger et al. ................. 382/130
6,011,862 A * 1/2000 Doi et al. .................... 382/132

FOREIGN PATENT DOCUMENTS

| EP | 0 616 290 A2 | 9/1994 |
| EP | 02 10 0307 | 6/2002 |
| WO | WO 91/11147 | 8/1991 |
| WO | WO 01/55965 A2 | 8/2001 |

* cited by examiner

Primary Examiner—David V Bruce
(74) Attorney, Agent, or Firm—John A. Merecki; Hoffman, Warnick & D'Alessandro LLC

(57) ABSTRACT

A digital image representation of a radiological image is acquired and applied to a display device connected to a computer and displayed. A measurement scheme is retrieved from the computer and activated. Measurements are performed on the displayed image under guidance of the activated measurement scheme.

15 Claims, 4 Drawing Sheets

METHOD OF PERFORMING GEOMETRIC MEASUREMENTS ON DIGITAL RADIOLOGICAL IMAGES

This application claims the benefit of U.S. provisional application No. 60/371,554 filed Apr. 10, 2002.

FIELD OF THE INVENTION

The present invention relates to computer-assisted radiological measurements on radiographic images.

BACKGROUND OF THE INVENTION

In musculoskeletal radiology, it is current practice to use a wide range of imaging modalities to determine skeletal disorders and abnormalities.

In this discipline diagnosis is often based on quantified radiological findings of geometrical quantities.

At least 50% of all radiological examinations today are conventional exposures of thorax and the skeleton. 80% of skeletal exposures leads to the correct diagnosis based on the radiographs.

A plurality of textbooks in the X-ray diagnostics from world-renowned radiological and orthopaedic experts make a contribution in this area.

However, to refine the diagnosis, to conduct better differential diagnosis, to assess severity of change, to plan and control therapy, to conduct treatment follow-up, to establish physical ability in sports medicine, labour medicine and military medicine, verbal descriptions based on skeletal radiographs are insufficient in many respects.

Better diagnosis can be achieved by quantifying radiological findings.

Geometrical quantities measured on radiological images must be checked against normal values. These normal values have been collected from measurements of a representative sample of the normal healthy population and are tabulated in the above-mentioned text books.

Geometrical measurements in digital images comprise linear and angular measurements. Linear measurements in 2 dimensions and 3 dimensions may be supplemented with distance along a curvilinear path. Angular measurements are considered in the plane of the image, in a world plane or in 3D space. Geometrical areas are considered in the image plane, or more generally of surface patches in 3D images. Volumes are computed in 3D images but may be based on planar measurements. Geometrical indices are clinical quantities based on image measurements. In any of these categories, the measurand is defined as the physical parameter being quantified by measurement.

Today, radiological measurements on X-ray images are either made on film using conventional measuring devices (such as a ruler, a caliper or a rubber band to measure lengths, and a square or goniometer to measure angles) or in a digital image displayed on screen using cursor controlled points (such as a pair of points to measure Euclidean distance between).

The current measurement procedure thus involves 4 distinct media:
1. An X-ray film comprising the anatomical sites to be measured, displayed on a light box. With the emergence of digital radiography modalities (film digitisation, computed radiography, digital radiography sensors), the digital image may be displayed on a computer display. However, such electronic medium still is physically different from the other components described hereafter.
2. A measurement atlas comprising the measurement scheme: imaging technique, graphical template and description of the measurements covered by the scheme (nomenclature, clinical significance, and normative tables, sometimes interchangeably represented by curves)
3. An analogue measurement device (ruler, square . . . ) to perform geometrical measurements,
4. Pencil/Paper to note the measurement quantity according to the appropriate medical nomenclature and the measurement value.

A calculator device may be needed to compute indices from a collection of measurements, or to convert measured values to true quantities using calibration measures. Alternatively, electronic spreadsheets may be used in conjunction with a database to store the measurements and indices.

The use of different media asks for repeated focusing of attention between the atlas and the radiological image. Moreover, in the absence of an atlas scheme the position of the measurement objects is not defined and hence different users may locate a given anatomical landmark differently.

Because there is no link between the measurement template in the atlas and its associated measurement entities, there is no systematically imposed consistency of the naming of measured quantities, and therefore exchange or collection of measurement values of different clinicians (e.g. for the purpose of cross-refereeing) is fundamentally hampered.

Another major drawback of the prior art method to perform geometrical measurements is increased measurement error or measurement uncertainty.

The error of measurement is the result of a measurement value minus the (true) value of the measurand. Measurement error is due to different sources, basically falling into one of two classes: systematic and random errors.

Systematic or bias errors arise from consistent and repeatable sources of error (like an offset in calibration). Systematic errors can be studied through inter-comparisons, calibrations, and error propagation from estimated systematic uncertainties in the sensors used. Systematic error is defined as the mean that would result from an infinite number of measurements of the same measurand carried out under repeatability conditions minus the (true) value of the measurand. This source of error can be reduced by better equipment and by calibration.

Random errors also referred to as statistical errors, arise from random fluctuations in the measurements. In particular, digitisation noise (e.g. geometric digitisation: finite pixel size; intensity digitisation: quantisation of grey levels) and the errors introduced by counting finite number of events (e.g. X-ray photon count) are examples of random errors in the context of digital X-ray images. Random error is defined as the result of a measurement minus the measurement that would result from an infinite number of measurements of the same measurand carried out under repeatability conditions. Particularly this source of error is prevailing in the prior art of performing measurements on X-ray images.

Inter-observer and intra-observer variance on measurement values contribute to this source of error, and has its origin in several forms of ambiguity in defining the measurand.

Lack of unambiguous definition of the measurand with respect to the imaged patient anatomy and lack of knowledge of the geometrical pose of the patient with respect to source and detector are the main source of random error.

Repeatability and reproducibility of a measurement require that the random errors involved in the measurement procedure are low. Although random errors are reduced when a measurement is repeated many times and the results averaged together, this can rarely be achieved in clinical practice.

It is an object of the present invention to provide a user-friendly radiological measurement method that overcomes the drawbacks of the prior art.

SUMMARY OF THE INVENTION

The above-mentioned objects are achieved by a method as set out in claim 1.

The method of the present invention is described with regard to geometrical measurements performed on radiological images of humans. It will be clear that the invention is not limited to human beings and can also be applied in other fields, for example in veterinary applications.

In the context of the present application the term 'activation' refers to loading a measurement scheme from memory and measurements to be performed according to the loaded scheme.

A measurement scheme or measurement template is a pattern of measurements to be performed. The measurements to be performed are grouped in the form of a measurement procedure wherein the sequence, the interdependence and method of measurements are defined. Such a measurement scheme can be noted and stored in a computer in standard notation XML (Extensible Mark-up Language).

In general the measurement scheme comprises a graphical part (also called graphical model) and an internal part (also called internal model).

The graphical part represents the geometric relation between measurement entities (objects and operators) and the anatomy in the type of image on which the measurements are to be performed. Measurement objects are e.g. points, lines, circles etc. The measurement objects are defined relative to the anatomy. The intended position with respect to the anatomy is thereby unambiguously denoted. The measurement objects can be labelled e.g. with the appropriate medical nomenclature. Other kinds of naming are possible, e.g. for naming intermediate objects needed in the course of the measurement procedure.

Measurement entities also comprise distances, angles which are the result of the measurement procedure and which are preferably also named according to medical convention.

The graphical part may also comprise measurement mark up such as a graphical indication of distance or angle.

It may also comprise textual annotations of the names of objects and entities.

In the graphical part, a region of interest box around a set of measurement points may be superimposed, to indicate the area to which geometric operators (such as zooming) or intensity operators (such as enhancement or landmark extraction operators) can be applied.

To ensure correct match with the image, e.g. with the imaged patient body part, the correct exposure parameters can be specified in the template, quantifying the imaging geometry. Angle of incidence and source-patient-detector distances are the most important geometric parameters, which much be observed at exposure time for a specific template to be applicable. Specific data structures and methods of each measurement entity and object class are devoted to control their graphical content and behaviour.

The measurement scheme may also comprise normative values associated with the measurement entities. These normative values are e.g. organised as a normative value table and are used for comparison with measured entities. Abnormal values may be signalled.

The internal part represents the functional dependencies between measurement entities. Functional dependencies comprise type of measurements, measurement methods, location of a measurement entity in a measurement dependency graph, order in which measurements are to be performed etc.

The internal model can be implemented as an object-oriented model of a coherent set of measurements to be performed on a digital (medical) image.

It can for example be represented by a measurement dependency graph. The internal model decomposes each measurement of a physical quantity into its constituent measurement objects. It further specifies methods to map the objects geometrically onto the medical image.

In informatics terms, the model is composed of objects belonging to an associated class, consisting of a collection of data structures and methods, said methods operating on the corresponding data structures.

The flow of execution of the measurements of the measurement scheme is imposed by a measurement dependency graph, in which the nodes correspond to measurement of geometric objects, and directed arcs define the relationship between the nodes.

As will be explained further on, the internal part may activate the nodes in several ways:

sequential point-only operation will first address all measurement points prior to evaluating the measurement object and operator nodes;

the sequential measurement object operation will let fire each node immediately when the results of all children are available, representing the pure data-flow case;

a node representing a set of points linked to an active contour model will invoke an automatic segmentation computation in order to compute the location of the image mapped points prior to firing the nodes representing geometrical objects based on said mapped points.

The graphical part and the internal part of the measurement scheme are bi-directionally linked such that the master-slave relation between the two parts is defined. The bi-directional link provides that measurements can be activated starting from the graphical part as well as starting from the internal part.

This means that either internal methods of the graphical objects may be invoked by addressing the graphical content of the measurement scheme. After pointing to a geometric entity in the stencil, a method, appropriate for the type and location of the geometric entity, is invoked to map the entity in the image. For example, clicking on a line may invoke the user interface method to position two pairs of juxtaposed points, each point pair yielding a midpoint coincident on the requested line. In contrast to a passive bitmap display of the measurement objects, which would require a knowledgeable user to map them graphically, the measurement scheme supplies the appropriate method. Analogously, a complete sub-graph corresponding to a measurement operator in the measurement dependency graph may be invoked from the measurement template window. For example, when the mouse cursor is over a the graphical representation of a measurement operator in the template window, it may change from an arrowhead appearance to a measurement operator symbol (e.g. a distance or an angle symbol), denoting that the associated sub-graph in the measurement dependency graph may be activated by pressing the mouse cursor.

or methods affecting the graphical behaviour of the measurement methods in the stencil and the radiological image may be steered by the internal methods or the internal control flow (e.g. a graphical entity in the stencil highlights when the corresponding node in the measurement dependency graph is visited).

In one embodiment a measurement scheme is selected from a measurement stencils repository. A measurement stencils repository comprises a number of measurement stencils. The selection is preferably performed in correspondence with the examination type and/or the radiographic exposure conditions.

The measurement scheme can be implemented as an active or as a passive measurement scheme.

An active measurement scheme (also called measurement template) is differentiated from a passive one in that the measurement procedure is guided in part or completely by a computerised procedure operating on image data. Guidance may range from simple computer guided sequencing of measurement operations to fully automatic execution based on automatically determining landmarks and deforming model contours representing anatomy.

The graphical part of the measurement scheme can be implemented as an stencil-overlay on the displayed X-ray image. The points and lines of the scheme must then be dragged by the user to the correct anatomical position in the displayed image.

In one embodiment, display of the graphical part of the measurement scheme may be omitted when measurements are simple and performed routinely on the radiograph. User guidance is effectuated here solely through the measurement dependency graph, which may generate the measurement points and objects immediately in the image, after which the user is requested to map them to their actual position. An example of such simple measurement is the cardio-thoracic index, which ratio is calculated routinely on thorax AP radiographs.

In one embodiment, more than one radiographic image may be displayed and a measurement scheme may be activated with more than two associated graphical parts. This configuration is useful for performing 3D measurements from measurements on a limited number of projections. For example, 3D spinal measurements may be obtained from locations of anatomical points identified on frontal and lateral radiographs of the spine. A measurement template with two graphical parts is activated here; one for each of the projections, and each graphical part guides the user in the mapping of the projection point of a certain 3D point in the associated projection images. A measurement point node in the measurement dependency graph will compute its 3D coordinates from the locations of the point in the respective projections. Likewise, 3D measurement object and operator nodes have 3D methods to calculate the 3D parameters of the object and the 3D measurement values respectively from the values of their children nodes.

Specific features and further embodiments of the present invention are set out in the dependent claims.

One aspect of the present invention relates to a computer program product adapted to carry out the method of the present invention when run on a computer. The computer program product is commonly stored in a computer readable carrier medium such as a CD-ROM. Alternatively the computer program product takes the form of an electric signal and can be communicated to a user through electronic communication.

The method of the present invention is advantageous over the prior art for the following reasons.

A first advantage of using a measurement template is the unambiguous and instantaneous indication as to the position of the measurement objects in the actual image. That is, the first source of random error in the prior art, due to a badly or non-defined measurand, is eradicated.

In a film-based method or in a generic computerised measurement method in conjunction with a radiological measurement atlas, repeated focusing of attention back and forth between the atlas and the radiological image are needed to locate the points precisely.

Moreover, in the absence of an atlas scheme, the position of measurement objects is not defined and hence different users may locate a given anatomical landmark differently.

In accordance with the present invention, the use of a digital template, especially when displayed in proximity of the radiographic image, substantially reduces the effort to locate measurement object points precisely and hence reduces intra-observer measurement error (error in repeated measurements of the same quantity performed by a single user) and inter-observer measurement error (error in repeated measurements of the same quantity between different users).

In the present invention the measurements are digital in contrast to the analogue measurements of the film-based method The precision of positional location is thus dependent on the image resolution (physical size of a pixel unit, which typically is around 100 $\mu$m for digital detectors).

In a specific embodiment measurement errors may be further reduced by the possibility of zooming into portions of a radiograph prior to locating a measurement point, and occasionally applying a sub-pixel location algorithm to define the position of image points with precision up to a fraction of a pixel unit.

Interesting measurement quantities are often derived from basic measurements by calculations that combine many measurements into final quantities, or from transformations, filters and fit procedures applied on the measurements. In such cases the uncertainty characteristics of the derived quantities can be derived by error propagation.

The ensembles of digital measurements laid out in a measurement scheme collectively define a standard manner on how the procedure must be performed. Standardisation is advantageous because it enables objective comparison (e.g. in second opinion gathering).

By the use of a measurement scheme the order of placement of measurement objects in the image is fixed and logical (eventually the order may be customised within the constraint of dependency). Therefore, in the template-guided measurement method of the present invention, there is no need to study the measurement scheme in an atlas to detect the order in which to place the measurement objects so as to guarantee that all depending objects are placed first. This way of operation is fundamentally different from the film-based method, where measurement templates may even be absent altogether. Repeatability of measurement procedures, obtained by an imposed order, enhances throughput of diagnostic evaluation of the radiograph, which is important for clinical departments such as emergency radiology and intensive care units.

The automatic abnormal value signalling functionality provided by a specific embodiment of the method of this invention, operating instantaneously on measurement values as they become available, makes the necessity superfluous of having the normative reference tables at hand, such as published in the open literature and measurement atlases.

The method of the current invention is particularly suited to implement different measurement schemes in the field of paediatric radiology, since measurement templates can be customised to reflect changes in paediatric anatomy over time. The graphical part of a measurement template will display the measurement points, objects and entities using anatomical landmarks corresponding to the patient's age. Furthermore age-specific normative values associated with the measurement template can be applied.

In the field of orthopaedics the invention is particularly useful because instantiated measurement schemes can be stored and used for further follow-up after therapy. The graphical part of an older template can be retrieved from memory and can serve as a new template for a current measurement. The older measurements can be compared with the new measurement results to assess evolution of a patient's condition. No confusion as to the manner in which the measurement objects and entities were defined is possible. Furthermore, second opinion gathering becomes more objective when it is based on the same graphically defined measurement scheme.

The method of the present invention is particularly useful in emergency radiology since the measurement scheme relies on the placement of a set of measurement point only after which the auto-completion of all dependent measurements is implied and automated so that the procedure lends itself to quick execution. This feature is not available in the prior art based on manual measurement based on analogue film measurements or computer measurements with a generic measurement tool.

As it will be clear from the description in the sequel, both repeatability and reproducibility are substantially enhanced by the stencil-guided measurement method of the present invention.

Repeatability conditions include (a) the same measurement procedure, (b) the same observer, (c) the same measurement instrument, used under the same conditions, (d) the same location and (e) repetition over a short period of time. Whereas fulfilment of these conditions is not guaranteed by the prior art methods, conditions (a), (c) and (d) are met by the current invention because use of a stencil and programmed methods to define the measurands ensure an identical procedure applied under all circumstances. Conditions (b) and (e) are fulfilled because the instantiated measurands in the image according to the stencil are stored and supplied to other referring clinicians, who only need to perform a confirming analysis.

A valid statement of reproducibility requires specification of the conditions changed. The changed conditions may include: (a) principle of measurement, (b) method of measurement, (c) observer, (d) measuring instrument, (e) reference standard, (f) location, (g) conditions of use, (h) time. Whereas fulfilment is not guaranteed by prior art film-based methods and generic computerised measuring tools, the stencil-based method as laid out in the current invention enhances reproducibility considerably. In particular, reproducibility conditions (a), (b), (d), (e), (g) are met because the definition of the measurands and their determination are fixed by and laid out in the stencil. The stencil-based method of the present invention is further invariant to reproducibility conditions (f) and (h), and condition (c) is achieved because storage and retrieval of prior instantiated measurement schemes render the need to re-perform the measurement scheme superfluous.

The objective of a measurement is to determine the value of the measurand, that is, the value of the particular quantity to be measured. A measurement therefore must begin with an appropriate specification of the measurand, the method of measurement, and the measurement procedure. In general, the result of the measurement is only an approximation or estimate of the value of the measurand and thus is complete only when accompanied by a statement of the uncertainty of that estimate.

Prior art methods such as film-based methods and generic computerised measurements do not cope with the problem that neither measurands nor measurement method are defined.

As a result, the uncertainty of the estimated value of a measurand cannot be determined because (a) a measurand must be defined by a standard method of measurement and (b) the implementation of the standard measurement method.

In the stencil-guided measurement method of the present invention, both definition of the measurands and implementation of the measurement method are prescribed.

Specific embodiments of the present invention will be explained with reference to the following drawings.

DETAILED DESCRIPTION OF THE INVENTION

Figure 1:
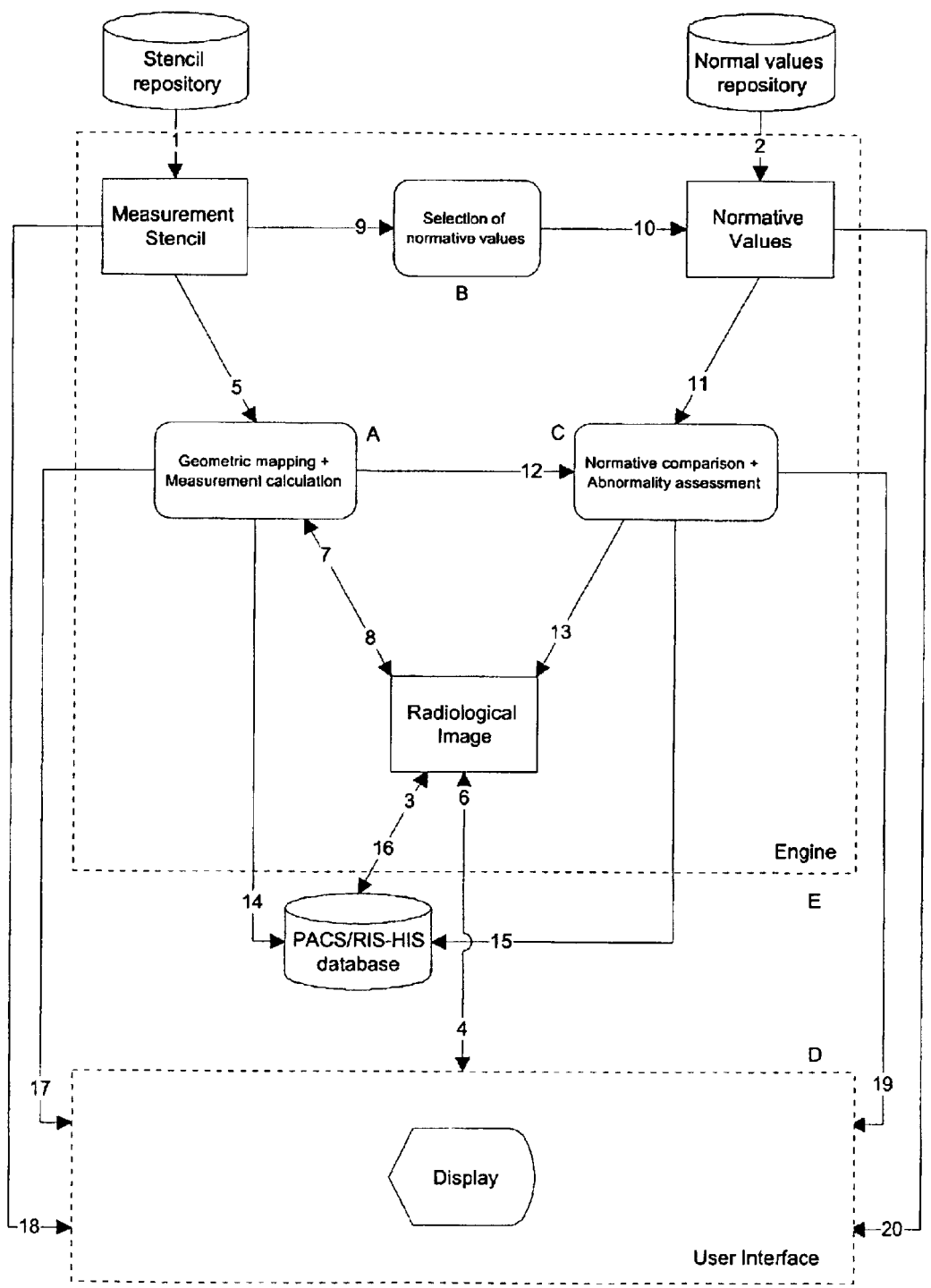
FIG. 1 generally illustrates the method of the present invention.

Prior to the description of the flow of operations of the method of the present invention, four different implementations of measurement scheme will be described:

as a graphical object, as a tree or graph oriented graphical structure, as a tree or graph oriented textual structure, as a structured document.

As a Graphical Object:

In this representation the anatomy is schematically depicted as a collection of outlines of bone and other radiologically well-manifested landmarks. The measurement objects are drawn superimposed onto the anatomical outlines.

This representation is useful in the course of performing complex measurement procedures since in this implementation the position of the measurement points is displayed with respect to the anatomy of the patient.

Fundamental to the representation as a graphical object is that this representation graphically depicts the spatial relationship between anatomical features and measurement objects.

The main advantage of this view is that it enables the user to define user points unambiguously. Hence this representation enhances the precision of the measurement procedure (i.e. the error that would result on the measurements when performed repeatedly by different radiographers).

Significant spatial relationships for two dimensional (plane) images can be defined for example (analogous relations can hold in three or more dimensions) between points, a point and a line (more general a point and a curve), a point and an area, between lines, line-area, between two areas, etc. Examples of relationships are incidence, betweenness, containment, etc.

For example, the center line of the femur bone, which is a 3D volume, may be defined on the basis of two points, each of which are exactly in the middle between a pair of juxtaposed points on the femur contour. The circularly shaped femur head may be described by a circle segment fitted only the femur head edge pixels (circle-contour incidence).

As a Tree or Graph Oriented Graphical Structure

The main advantage of this representation is the ability to view the dependencies between measurements, and thus the implicit order of performing the actual measurements. Measurement entity sharing, the term used in this context to denote the use of a measurement entity by more than one super entity, is also expressed in the graphical structure. When one or more entities are shared by more than one super entities, a dependency graph is obtained, whereas in the absence of sharing, a dependency tree results.

Obviously, measurements that depend on others can only be performed or calculated when the latter have been done. The procedural nature implied by this representation is an advantage because it guides the user and formalizes the measurement.

In the prior art, it was the user's task to analyze and extract the right order from a published measurement scheme, which is time-consuming and error-prone. In the absence of a guiding scheme, measurements performed at a given point in time may become invalid when depending measurements were erroneously skipped over.

A measurement scheme will typically have more measurement results as outcomes. Each measurement result is represented by a graph, or a tree when there are no cycles, i.e. no shared measurement entities. A collection of disconnected trees is called a forest.

Though the definition of a tree implies no direction on the edges, a tree is usually drawn with the root at the top and the direction is from top to bottom. The root node represents the highest-level measurement entity, usually having a diagnostic meaning, a name according to the medical nomenclature and possibly an associated normative values table. The children of the root node represent constituent measurement entities such as points, lines, circles etc. Each of these nodes may in turn depend on still other measurement entities. The bottommost terminal points in a tree are called leaves. Because the most primitive user interaction by means of which anatomical points are indicated in the digital image is a mouse pointer click, all leave nodes graphically represent points (at pixel or sub-pixel locations) and all other graphical objects such as lines, circles or curves will ultimately be determined by user-defined points or calculated points.

All nodes are collectively called measurement entities. Each node basically falls into one of two types:

measurement operator

The measurement operator performs a measurement operation. This type is further subdivided according to the type of resulting quantity.

Pure measurement operations

Pure measurement operations have measurement objects as their arguments and produce physical quantities such as distance, curvilinear length, angle, area, volume etc. as a result. For example, in radiography, the heart volume in a neonate is calculated as $V = F \cdot A \cdot B \cdot C$, with A,B and C perpendicular axes of an ellipsoid inscribed in the cardiac silhouette on AP and profile radiographs, and F a factor including both the ellipsoid formula constant and the magnification factor, and further being dependent on patient specific data such as age and weight.

Arithmetic measurement operations

Arithmetic expressions operate on measurement objects and result in (clinical) indices such as ratios between distances (e.g. cardio-thoracic index), ratios between areas (e.g. ventricle-brain ratio) etc.

For example, the cardio-thoracic ratio is defined as C/T with C the width of the cardiac silhouette at its greatest extent to the right and left of the spine, and T the inner width of the thoracic rib cage measured at different levels.

In this category fall complex arithmetic relationships expressed by a nomogram in the prior art. For example, the calculation of the body surface area and the assessment of gestational age from lumbar spine dimensions are based on nonlinear relationships of the constituent measurements or parameters. The graphical evaluation of the nomogram is emulated electronically in the present invention.

measurement object

A measurement object is a geometrical object that can be depicted graphically, and that has physical or anatomical support. In informatics terms, measurement objects are instances of a class.

The following classes are particularly relevant:

Point

A point represents a location in space, on the image and on the stencil drawing, and has no width, height or depth. Measurements based on points must adopt a convention for locating the pixel's origin. Because each pixel has a certain size, the point represented by a pixel can be either the center of the pixel's square, or one of the corners of it.

The point class is further subdivided in

User-defined points (Upoints)

These points must be drawn on the screen by the user either by a mouse pointer, or other digital input means such as a graphical tablet e.g.

Derived points (Dpoints)

These points are needed in the course of the measurement procedure but in contrast to user-defined points, derived points are the result of geometrical calculation based on available graphical objects. Examples are the intersection of two lines, the intersection of a line and the perpendicular of a line through a given point etc. The procedures to locate a certain point as a geometric locus are defined in the methods of the point class.

All other measurement objects in the digital image are ultimately based on points, either user-defined or derived.

Line

A line is a graphical object in 3D space with indefinite length and no breadth. A straight line is the shortest distance between two points in 3D space and is commonly referred to as "line". For two-dimensional images, we consider the projections of 3D lines in the image plane, which are also lines. In its simplest form, a line may be specified by drawing two points, each point drawn independently according to methods outlined in the point class. Alternatively, a line may be derived according to properties of other graphical objects (e.g. tangent and perpendicular orientation). Finally, a line may be calculated on the basis of a plurality of image points such as edge pixels by a fitting procedure.

A line segment is specified by limiting the extent of a line between interval bounds.

Compound linear objects such as triangles, quadrilaterals, regular and general polygons are classes based upon the line class.

The line class specifies the methods how the line is determined in the image.

Analytic Curve

This class contains graphical objects that are generated in the image by evaluating an analytic equation. This class is also called parametric curve class. Two types of analytic curves deserve special attention in the context of a diagnostic measurement tool:

Circle

A circle is a closed curve, all points of which are the same distance from a point called the center. The center point may be drawn according to one of the methods specified in the point class. The radius may be specified by drawing another point on the circle's circumference. Also, three non-collinear points, each drawn independently according to methods outlined in the point class, uniquely define a circle. Alternatively, a circle may be specified according to properties of other graphical objects. Finally, analogous to a line, a circle may be calculated on the basis of a plurality (more than 3) of image points, such as edge pixels, by a fitting procedure.

A circular arc is specified by limiting the circumference of the circle between angular bounds.

Ellipse

An ellipse is generated by a point moving so that the sum of its distances from two points (the foci) is constant and equal to the major axis. The ellipse object is important in planar images because the parallel projection of a circle in 3D space is an ellipse. Metallic rings (e.g. embedded in the liner of a sphere-shaped cup prosthesis to make its outline and orientation visible in the image) with a certain 3D orientation project in the 2D image plane as ellipses. Again, as for all graphical objects having analytic description, ellipses may be calculated on the basis of a plurality of image points such as edge pixels by a fitting procedure.

Polynomial curves

Polynomial curves such as a parabola have clinical utility in measurement schemes as well. For example, the outline of corresponding anatomical landmarks on the spinal process may be fitted with a polynomial of degree sufficient to make a least-squares fit error lower than a pre-defined threshold. Pathological displacements with respect to the mean curve of one or more vertebrae may then be detected by imposing a suitable threshold on the standard deviation (typically 2 . . . 3 SD).

Pseudospondylolisthesis and spondylolisthesis, which are manifested by a forward shift or bulge of a vertebra, over the edge of the one below it, may be assessed likewise. A curvature measure, computed on the basis of a fitted polynomial, may be used to quantify kyphosis or lordosis spinal deformity.

Bézier and Spline Curve

Curves in 2D and surfaces in 3D with a more complex shape may be described by piecewise polynomial subdivisions of a desired object shape, each of the curve segments defined by a control polygon and a basis of interpolating blending functions to establish the relationship between the curve and the control polygon. The control polygon for cubic ($3^{rd}$ degree) splines consists of 4 points which may either be defined by methods outlined above, or may be derived on the basis of least-squares fitting. Of particular interest is the approximation of an object shape in the image with a fitting Bezier or spline shape based on the edge points of the object. Distance of an open-ended curve may be computed as the curvilinear path length defined as the path length integral between 2 points lying on the curve. An angle between two lines tangent to the curve at a two points, may likewise be calculated based on the derivatives of the curve's analytic function.

Because the result of a measurement scheme is a quantity, the root node type is always a measurement operator (either pure or arithmetic).

The arity of the nodes of a tree will generally depend on the complexity of the measurement. Measurement operators such as distance or angle involve two operands (e.g. the distance between two points, between a point and a line, the angle between two lines etc.). Arithmetic expressions based on measurements can also be expressed by or converted to a tree having binary nodes only. These binary arithmetic trees are also called a parse trees, and are constructed from expressions in either parenthesized infix or postfix (reverse Polish) notation.

The arcs between a node and its descendants (children) denote the relationship between them. For measurement operators, the relationship refines the arguments; for measurement objects, relationship can be read from the descendant node (children) towards the depending node (parent). For example:

the binary measurement operator "angle" subtended between two lines may be described as:
angle (from line, to line) and the relationships are from (first line), to (second line)

the intersection point between two lines is described as the point that is the geometric containment of both lines: intersection (containment line, containment line) The term "intersection" is used here instead of the more general object name "point". The relationship can be read: the line contains the point.

a circle may be defined by three point coincident on it: circle (incident point, incident point, incident point). The relationship can be read: the point is incident on the circle.

the perpendicular distance from a given point to a given line is computed by first calculating the intersection between the given line and the perpendicular onto that line, and next calculating the distance between the given point and the intersection point ratio (nominator measurement operator, denominator measurement operator) and the relationships are nominator, denominator:

ratio (nominator operator, denominator operator), and each of the arguments is the result of a measurement operation.

Specification of the method of computing the object of a node may be intrinsically or extrinsically. The leave nodes, representing points in the image, are generally computed by a method based on internal parameters of the nodes only. In passive measurement templates, for example, the points may be defined by pixels designated by the user via the graphical user interface.

Definition of the relationship enables a node to perform its computation of the value of the node. In the example given, when two lines each have a relationship of containment of a point, the method of computation of the intersection point is invoked and the result is passed to the higher-level nodes. When the relationships between a point and a line with a desired line are one of incidence and perpendicularity respectively, an algorithm that computes of the perpendicular line through a point onto a line is performed.

For active measurement templates, the leave nodes of the measurement dependency graph represent groupings of pixels, belonging to an anatomical contour, and the method of computing these pixels is specified by an edge detection and linking algorithm. The depending node will subsequently perform a model-based deformable contour segmentation on the basis of edge and region based features, mapping the instantiated model contour onto the anatomical data. The output of such a node is one or more points, representing requested measurement point(s) mapped to its corresponding position in the image.

As a Tree or Graph Oriented Textual Structure

This representation is particularly suited to perform customization of existing measurements, or to create measurement schemes from scratch. A two-pane view can be used for this purpose. The left pane displays the trees making up the measurement scheme(s). To convey dependency structure, each sub-level of the tree is indented with respect to parent level. Each node of the tree has an associated flag indicating that the underlying sub-tree is either contracted (flag is a "+" sign, indicating that the node has children that currently are invisible but may be viewed by pressing the flag button, upon which the flag turns into a "−" sign)—or expanded (flag is a "−" sign, indicating that the node's children may be hidden by pressing the flag button, after which the flag turns into a "+" sign). Customization proceeds by copying subsets of measurements from an existing scheme (or a number of schemes) to a new scheme by mouse-dragging the top-node of a sub-tree from the left pane to the right pane. Alternatively, a copy-paste sequence (CTRL-C/CTRL-V key strokes) may be used. To refine the resulting measurement tree(s) in the right pane, individual measurements may either be deleted, or added by drawing them from a generic measurement toolbox.

As a Structured Document

In this representation, individual measurements, collections of measurements and measurement dependencies are stored in a document comprised of information entities. Layering type and structure of the information is encoded according to a generally adopted standard such as the XML (Extensible Mark-up Language) recommendation for example. The main advantage of this type of information storage is the universal exchangeability of measurement schemes and associated measurement data. The declarative nature implied by this representation is advantageous for subsequent operations such as storage and archiving, abnormal value signaling, and data mining. The structured document representation also lends itself for customization of templates. Custom-made measurement schemes may be built from scratch, by performing measurement drawn from the general measurements toolbox, and finally saving the resulting procedure. Likewise, an existing measurement stencil can be modified by adding measurements from the general measurements toolbox or omitting measurements (both subject to conditional dependencies) and saving the result as a new template. A third way of customization consists in that a new template may be constructed departing from two existing complete measurement templates by matching and merging their XML trees (or sub-trees) according to a set of merging rules operating on individual nodes such as updating, adding, deleting and moving nodes or aggregated nodes (sub-trees) such as sub-tree graft (inserting a sub-tree), sub-tree prune (deleting a sub-tree), sub-tree move (moving a sub-tree). Node equality comparison may be based on matching of node ID's or the node tag name and content. Prior art for merging trees may be used to this purpose such as the IBM Alphaworks' XMLTreeDiff and XMLDiff ("XML Diff and Merge Tool"). More than two templates may be merged by iterating this procedure.

The following is a description of the flow of operations when passive measurement templates are used.

After the digital image has been acquired and displayed and the measurement template has been selected, a geometrical mapping process is invoked to request the user to place all measurement objects in the image whereupon the corresponding position in the image is entered into the computing system.

Depending on whether or not image data or image-derived data are used in the process of locating the measurement objects, a measurement template is termed either active or passive.

In a passive measurement template all measurement objects are placed manually in the displayed image. It is the user's responsibility to locate all measurement points in accordance with the measurement template sketch displayed simultaneously and in close vicinity with (or superimposed on) the radiograph.

When using passive measurement templates, two embodiments of user-system interaction may be considered depending on the way in which the internal informatics model of the measurement template is activated.

In one embodiment, all user-requested measurement points are mapped prior to generating the measurement objects that depend on them. All measurement objects are highlighted on the digital sketch upon which a copy of the object is generated and the user is requested to drag and adjust the copy to its corresponding position in the actual radiographic image. When all measurement points are available, the depending measurement objects are generated and the result of the measurement operators is computed.

This mode has the advantage that it enables quick execution of the measurement template because all user-interactions are concentrated in a single pass.

It has the disadvantage that fewer insight is gained how the template has built up the measurements. Also, eventual errors in locating individual points are less easily discerned and corrected.

In a second embodiment, the measurement objects are generated when all points defining them are available, and likewise, the result of measurement operators may be computed when all required objects are known.

This mode has the advantage that the user has close control over the measurement procedure as it is constructed gradually, which is especially advantageous for complex measurement schemes. In the occurring event that the user establishes the current object wrongly, he/she may re-position the underlying points, without affecting the rest of the procedure.

It has the drawback that superposition of too many lines and mark-up in the course of the procedure may prevent the user from accurately positioning the remaining points.

When a measurement operator node is addressed in the internal model of the passive measurement template, the measurement value is calculated. The calculated data may be corrected on the basis of calibration data derived from calibration objects in the image (such as a ruler).

Furthermore, based on the measurement dependency graph, errors can be propagated to provide an estimate of measurement uncertainty.

At the time of processing a measurement operator node, a process can be initiated that selects the normative value associated with the anatomical quantity produced by the measurement operator node in the given template.

The proper identifier and patient data are sent to a normative values repository, and the raw normative reference and its semantics are retrieved.

Normalisation is performed when needed, for example to express the acceptable range to the commonly used 2-sigma range, or to a user customised range when the standard deviation is retrieved, or to perform the nomographic look-up procedure when normative values are encoded in nomograms. The final normative values are applied to the result of the measurement operator, and normality/abnormality is messaged.

The result of measurement operators and their associated uncertainty bounds can be displayed textually in a measurement values window, and depicted graphically using suitable mark-up produced by an automatic dimensioning process. Likewise, normal values can also be displayed textually and depicted graphically, to enable clinical assessment of the normality/abnormality of the measurement value in relationship to its uncertainty.

Two modes may be considered when using a passive measurement template: manual placement mode and enhanced placement mode.

In the manual placement mode all constituent points required to derive a given measurement object are placed manually in the image by dragging the mouse pointer until it is over the anatomical location of interest and clicking the mouse or a key to fix the position. Portions of the image may be zoomed out to define the point's position to within pixel unit precision.

The enhanced placement mode is achieved by hinting the user as to the position of a constituent point of a measurement object by confining the placement to a set of points or objects defined by the graphical construction defined so far. These set of geometric objects are called the geometric loci of a geometric problem. When the mouse cursor is moved, that point of said set, which is closest to the mouse cursor, is highlighted along with its property with respect to the measurement object being drawn (e.g. it is a tangent point, perpendicular point, center point, end point, topmost point, leftmost point, inflection point etc.).

If the user accepts the suggested point, he or she presses the mouse button, even when the cursor is not exactly over that point, and the mouse cursor will immediately jump to it.

This mode is also called snap placement mode, and makes it possible to exactly pick out the location of a given point. Obviously, because analytical expressions of measurement objects enable exact geometrical solutions, the geometrical measurement precision is substantially enhanced in this mode.

Setting snap to lines or other graphical entities has a similar effect: e.g. the line tangent to a circle (there are two such lines) through a given point is selected when moving the cursor nearest towards the intended tangent point, and a mouse click will teleport the cursor onto that tangent point on the circle, after which drawing of the tangent line completes the drawing of the line measurement object.

When the set of attractor points contains only one point, the drawing action completes without any further user interaction. This auto-completion property is made possible because the measurement template names each measurement object (according to medical nomenclature), and the measurement scheme uses the name of objects to uniquely designate each of them.

For example, suppose that three lines have been drawn in the image, named A, B and C, and a fourth line D needs be drawn through a point p perpendicular to line B.

Line D can be drawn immediately after placing point p, because of all three possible perpendicular intersection points, the intersection point with line B is the target point. Without naming of objects, the user would be faced with three possibilities in this example.

When multiple snap objects still exist, such as in the case of a line through a given point and tangent to a circle, the user must resolve the intended point by moving the cursor towards it (which will invoke highlighting of it) and completing the editing by pressing the mouse.

Enhanced measurement precision and faster measurement completion are the main advantages of this mode.

Defining objects based on attractor or snap objects is different from active measurement objects, to be defined further, because they are geometric loci, based on and calculated with the internal descriptions of the graphical measurement objects (e.g. equations of line, circle . . . ) whereas active measurement objects get their final position and shape based on image or image-derived data.

The following is a description of the flow of operations when active measurement templates are used.

Also in this embodiment the digital image that has been acquired is displayed. Then a measurement template is selected and a geometrical mapping process is invoked to request the user to place all measurement objects in the image whereupon the corresponding position in the image is entered into the computing system.

When image data and/or image-derived data are used in the process of locating the measurement objects, the measurement template is termed active.

In contrast to the passive measurement template, the geometrical mapping process for active measurement templates is based on automatic landmark, feature and object locating by applying suitable image processing operators and algorithms.

These algorithms assume that the location of the measurement points may be modelled either directly or indirectly.

In direct modelling the measurement point is specified in terms of a local pre-defined configuration of grey value characteristics. In indirect modelling it is assumed that a set of measurement points may be defined in spatial relationship to an anatomical shape of which representative models (either 2D or 3D) have been built that are mapped in the image (either 2D or 3D). In 2D images, models may typically take the form of collections of open-ended or closed curves. In 3D images the models may take the form of surfaces.

Initialisation comprises the mapping of anchor points in spatial relation to which the initial position of the instantiated model contours will be positioned.

The initial pose and shape of the model contours is adapted according to the spatial disposition of the anchor points in the image.

Pose comprises the translation, orientation and size (i.e. position of the origin point of the instantiated model contour, orientation of an axis of the contour relative to the orientation of lines connecting the anchor points, and the applied magnification). Shape comprises size and initial form of the contour, which may be expressed by a transformation matrix calculated on the basis of the anchor points of the model space and the corresponding anchor points located in the image.

For example, two points in a plane define an Euclidean similarity transformation (translation, rotation, scale) in that plane, three anchor points (forming a triangle) define an affine frame (translation, rotation, scale and x and y shear), four anchor points (forming a quadrangle) define a projective frame (translation, rotation, scale, x and y shear and projections).

On the basis of the computed transformation parameters, the initial curves representing anatomical entities are instantiated in the image, or the regions of interest around anatomical landmarks are mapped in the image.

Initialisation further comprises setting suitable parameters for the segmentation such as parameters for the internal and external forces of snake deformation (i.e the coefficients of elasticity, rigidity and the weight associated with the image data).

An image processing procedure subsequently calculates the precise segmentation of anatomical entity contours or anatomical landmarks on the basis of image data only.

Measurement objects, the definition of which is determined in relationship to the delineated anatomical geometry, are computed and drawn superimposed on the segmentation. The user is prompted to accept the segmentation and landmarks, and the computed measurement objects. In the event of mal-positioned objects, the procedure is re-iterated with user-adapted initial parameters.

The remainder of the flow of operations in an active measurement template is identical to the flow based on a passive measurement template.

Mixed measurement schemes may be constructed and effectuated also, where measurement objects are located by combining manual mapping of the anatomical points with automatic point mapping based on contour and region segmentation of some anatomical entities that have linked the required points into their representation.

The following is a general overall description of an embodiment of a procedure for performing a digital stencil guided measurement according to the present invention. The constituent method steps are explained in detail.

Image Acquisition and Display

A digital image representation of an image onto which geometric measurements are to be made is acquired.

A large variety of image acquisition systems are applicable. The radiation image can for example be recorded on a photo-stimulable phosphor screen. The screen carrying the radiation image is then read out by scanning it with stimulating radiation, detecting the image-modulated light which is emitted upon stimulation and by converting the image-wise modulated light into a signal representation of the radiation image.

In an alternative embodiment the radiation image is stored in a direct radiation sensor rendering a signal representation of a radiation image.

Still further alternatives for acquiring a digital signal representation of a radiation image, such as scanning of radiographic film carrying a radiation image, are possible.

It will be clear that the image representation may also be retrieved from an image database, e.g. part of a RIS (radiology information system) or HIS (hospital information system) or PACS (picture archiving and communication system).

The acquired image representation is next applied to a display device connected to a computer and the image is displayed.

Template Retrieval and Display

The measurement template is selected from a measurement stencil repository stored in the computer.

The selection is preferably made according to the examination type, imaging parameters and patient specific information.

The examination type determines the anatomical part imaged. Imaging parameters such as angle of incidence, distance between radiation source and patient and resolution are important selection criterions. Age and gender may also affect anatomical appearance of body organs.

The selected template is retrieved, loaded and activated in the system.

In one embodiment this involves:

Activation of the measurement dependency graph and registration of all needed measurement methods for the constituent measurement points and measurement objects, Generating a graphical representation of the measurement template displayed in close vicinity of the radiographic image. Associated with the graphical representation, a structured document frame is generated. The document frame holds a description of the graphical layout of the measurement scheme in the current image in a universally exchangeable format such as SVG (Scalable Vector Graphics, which is a language for describing two-dimensional vector and mixed vector/raster graphics in XML). In this document frame all actualised graphical parameters of the measurement objects and entities will be stored.

Generating the measurement values window displaying the medical nomenclature of all measurands in the scheme, and a set of numerical values pertaining to the measurement. This set comprises the actual measurement value and units, an applicable calibration factor, the normative reference value if one is provided, and an abnormality-alerting box. Associated with the measurement values window, a structured document frame is generated holding a tagged description of the measurement scheme in a universally exchangeable format such as XML (Extensible Mark-up Language), and into which all measurand-specific measurement values will be inserted.

Locating Measurement Points

The measurement template has the purpose of defining the measurands with respect to the anatomy and of defining how the constituent points, defining a measurand, are to be placed in relationship to the anatomy.

In the described embodiment of the present invention, three placement modes are described: manual placement, ROI magnified placement, automated placement based on deformable contour segmentation.

Figure 2:
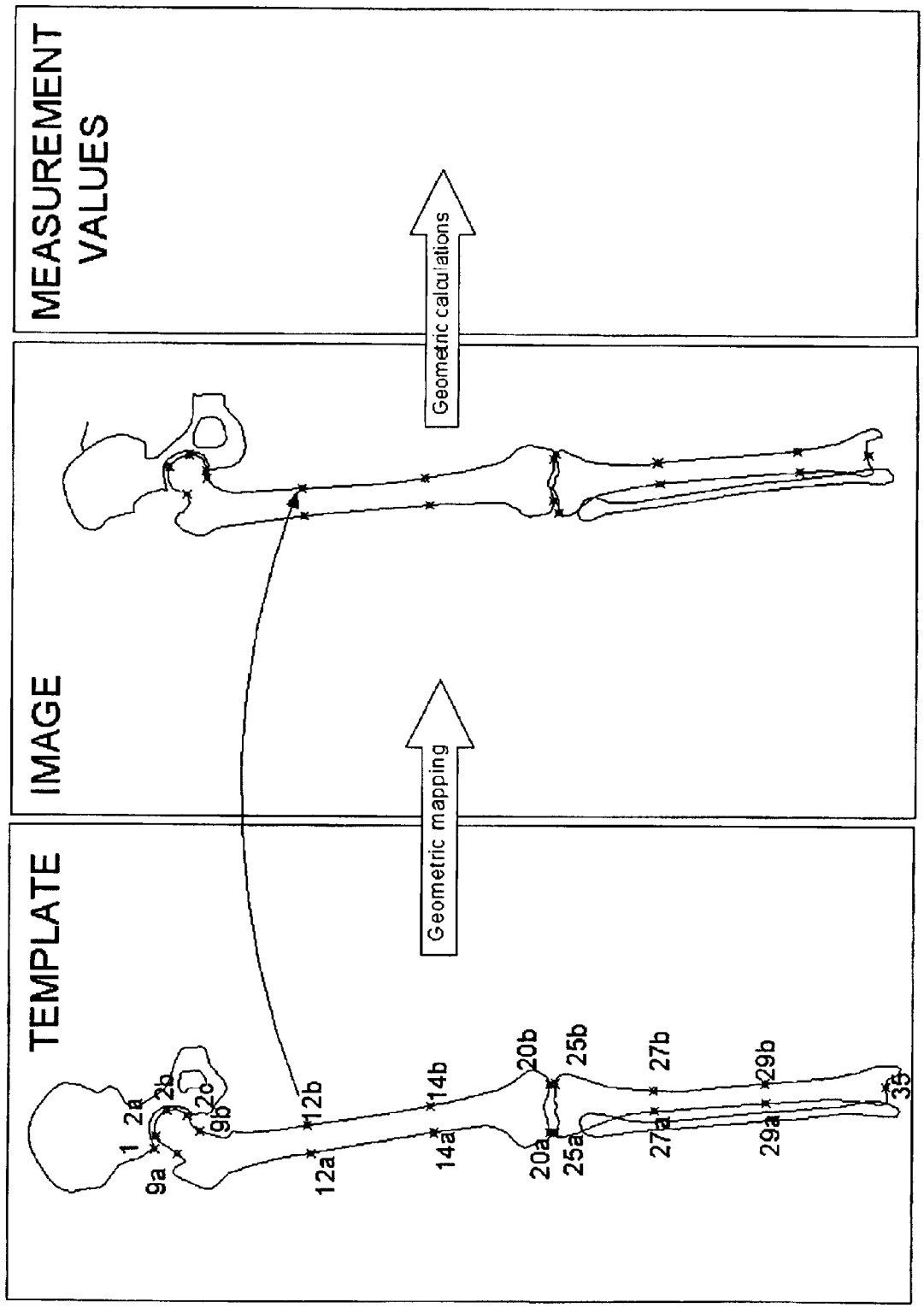
FIG. 2 illustrates the manual mapping of measurement objects according to the geometric specification of the measurement scheme.

1. Manual Placement (FIG. 2)

In this mode, all points are placed manually in the image by cursor clicks.

In this embodiment the measurement template imposes the placement order by highlighting each point in sequence (e.g. by blinking the point in the template).

Following this order ensures that at any point in time, the system knows which measurement object is being defined by virtue of its definition in the template, and hence which measurement objects and mark-up are to be generated next or which measurement entities may be computed next because of availability of all constituent points of the measurand.

This auto-completion feature is possible because the dependency graph of the measurement template defines how measurement objects and entities are computed on the basis of existing objects.

This property is not available in generic measurement tools of the prior art.

Alternatively, completion of objects and entities of higher layers may be deferred until the user determines all points of the bottommost layer. This alternative embodiment has the advantage that no graphical display of auto-generated objects and entities will obscure the precise placement of subsequent points, which is particularly useful when complex measurement schemes need be performed.

Alternatively, image data and measurement mark-up may be organised and stored in different layers into computer memory, the display of which is turned on and off depending on the current action being performed. For example, when the user is positioning points, the display of any unimportant graphics may be turned off.

Figure 3:
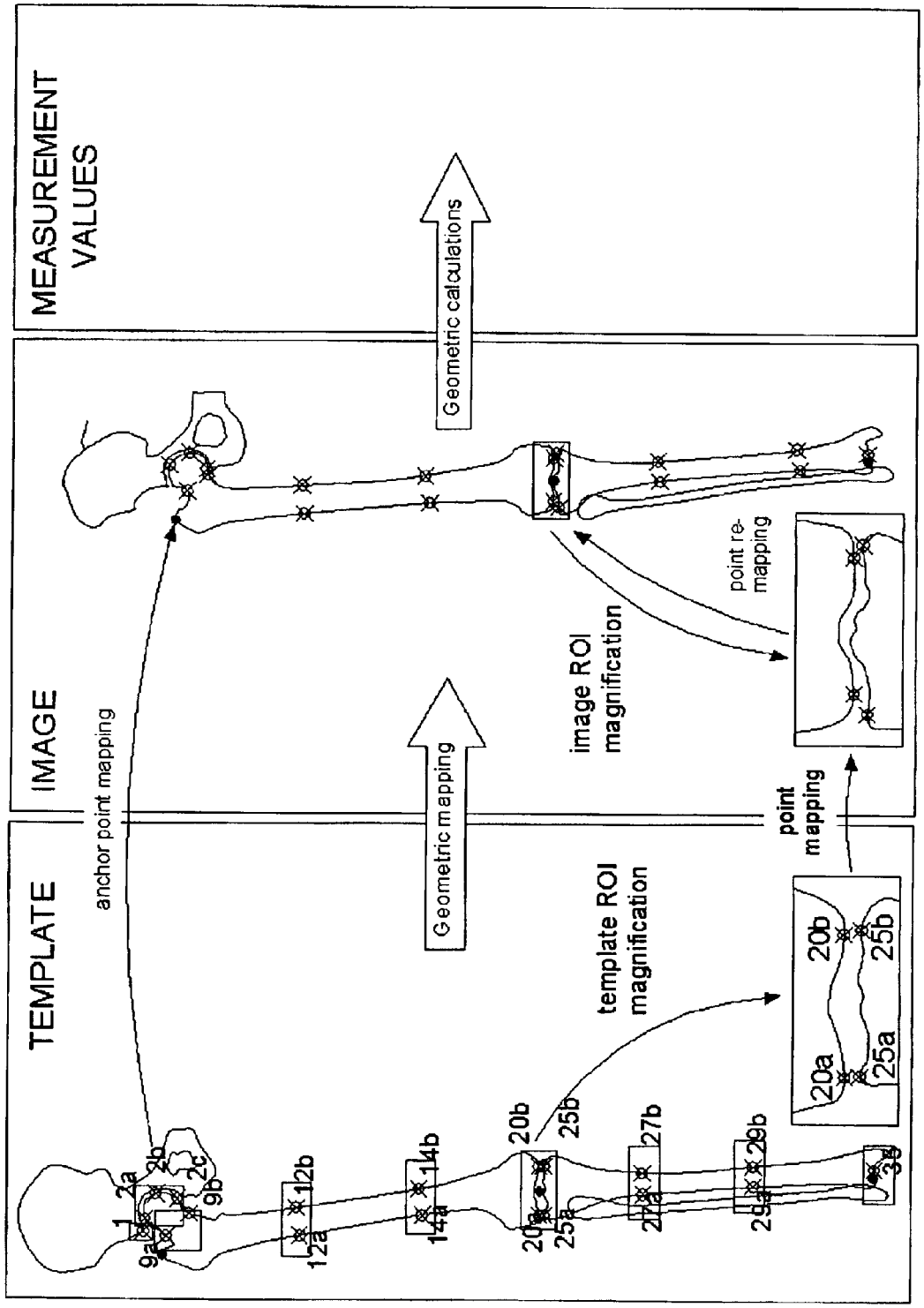
FIG. 3 illustrates the ROI-magnified manual mapping of measurement objects according to the geometric specification of the measurement scheme.

2. ROI-Magnified Placement (FIG. 3)

In this mode, measurement points are placed more accurately in the image by magnifying a region of interest (ROI) box around the measurement point.

Each measurement point has an associated ROI, which is an image region covering a particular body part or joint, and wherein the measurement point is contained.

A ROI may contain a set of measurement points if all of them have similar anatomical semantics and are optimally determined simultaneously.

For example, one single ROI covering the femur head is used to locate three separate points sampled identically and approximately equidistant along the femur head's contour and collectively approximating the circularly shaped femur head boundary.

In the described embodiment, in order to determine the image ROI corresponding to a measurement point, the portion of the image around the mouse cursor is magnified constantly as the mouse is moved over the image, the size of said image ROI being determined by the measurement template. A mouse cursor click freezes the magnification around the current mouse position when the operator believes the ROI is covering the image region containing the desired measurement point. The point editing is completed by a second mouse click at the anatomical image location of the measurement point. As the magnification enables to view image data to pixel-level resolution, individual pixels may be selected unambiguously.

An alternative for speeding up the determination of the image ROI's is the semi-automated position of ROI's relative to a few user-defined points, the position of which is anchored with respect to the anatomy as depicted in the measurement template.

Anchor points are sets of points in the template, which have specific anatomical meaning, which are easily locatable, and which are few in number yet enable full location of all ROI's.

In a full-leg examination, eligible points are the bony landmarks corresponding to the greater trochanter, the femoral intercondylar notch and the upper ankle joint center.

Because each ROI has sufficient extent and its location around the measurement point in the image allows certain positional variation, mild positional variation of the anchor points is tolerated as well. The position of previous measurement points inside their associated ROI's may refine the position of ROI's of subsequent measurement points.

A portion of the graphical measurement stencil around the measurement point may be magnified also to better view the point's relationship to the depicted anatomy. The measurement template encodes the precise boundary of all ROI's around their measurement point(s).

The zoomed portion of the image corresponding to the ROI may be placed either inside the image, at a position centered around the mouse cursor, or alternatively in a separate zoomed image data window.

Analogous to the manual placement mode, generating the graphics and mark-up of measurement objects and entities may be deferred until the position of all points of the bottommost layer of the dependency graph of the measurement template have been determined in the image.

Figure 4:
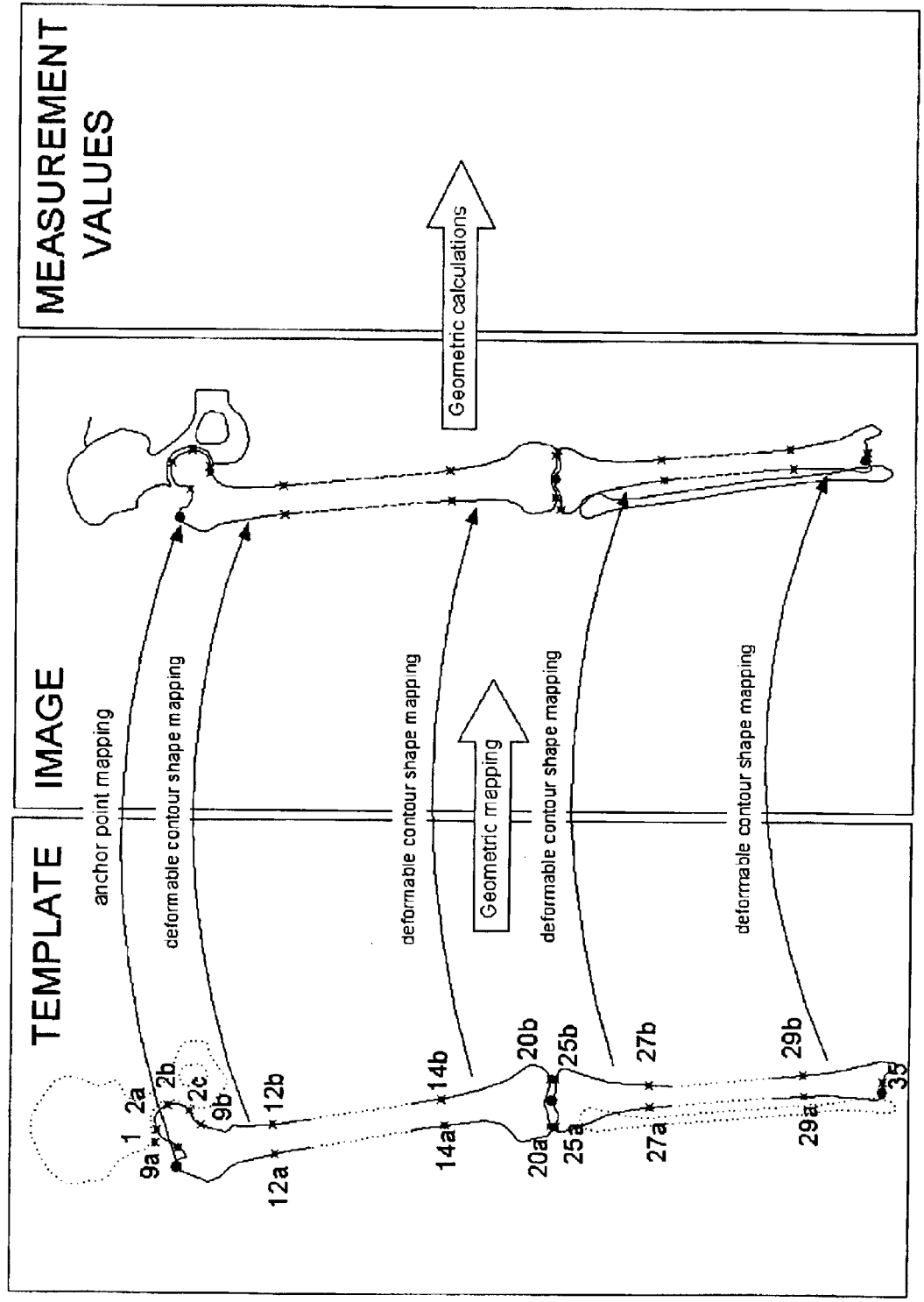
FIG. 4 illustrates the automated placement based on deformable contour segmentation.

3. Automated Placement Based on Deformable Contour Segmentation (FIG. 4)

In this mode, no direct placement of measurement points is required. Instead, the position of measurement points is defined in relationship to contour models representing patient anatomical entities.

Hence, the position of measurement points and objects is indirectly specified by their associated position and local features on an instantiated and subsequently deformed model contour.

Examples of the relationship of desired measurement points may be incidence (of the measurement point on the contour), midpoint (with respect to pairs of specific locations on the contour), and barycenter (with respect to configurations of specific point locations on the contour).

Examples of the relationship of desired measurement lines may be fitted tangent line (with respect to a specific location on the contour), symmetry line (with respect to juxtaposed segments of contour pixels).

Examples of the relationship of desired measurement curves may be fitted circle arcs (with respect to specific circularly shaped segments of the contour), and fitted parabola's or higher order polynomials to extremal points of groups of contours.

Automatic placement and deformation of the instantiated model contour(s) can be based on automatically segmenting the bony outlines based on Point Distribution Models (PDM) and Active Shape Models (ASM). This segmentation principle can for example be applied to individual vertebrae of the spine, the hand and the hip.

The initial position of the instantiated model contours can likewise be based on a small set of anchor points, relative to which the initial pose (translation, rotation, scale) of each instantiated contour is determined and further be adjusted according to affine or projective transforms. Alternatively, object recognition techniques may be used to locate the anatomical site corresponding to the model contour.

Chaining of Measurement Operations

The computation of measurement objects and measurement entities follows an execution flow as determined by the order of visiting the nodes of the dependency graph.

The bottommost level contains points only, of which the determination of their position is requested from the user.

Levels above the bottommost layer contain measurement objects and entities that build upon these user points.

Prior art is used to traverse the measurement dependency graph. Because all measurement points must be determined first, prior to being able to execute the parent nodes, the visiting order is: "visit the left subtree, then visit the right subtree, then visit the root", or equivalently, "visit the children, then their parent(s)".

This is a postorder graph traversal, based on a stack data structure to store the nodes. From a point of view of calculation, this is a demand-driven data flow network, because a node can only be computed when all data, required in its computation, are available.

Derivation and drawing of measurands and measurement mark-up Based on the measurement point's coordinates in the image, the measurement objects (lines, circles, parabola's etc.) are generated using methods that are widely known in computer graphics.

Calculation and display of measurement values and uncertainties The calculation of the measurement operator values, such as distances and angles, are based on the geometrical location of the measurement objects in the image and are computed following principles of geometry.

In this embodiment the raw value obtained from the image-based location of the measurement objects is corrected using calibration factors.

E.g. magnification and pixel size are basic calibration factors to convert pixel distances to physical distance.

Raw values, correction and calibration factors, and physical measurement values are tabulated and displayed in a measurement values window.

Measurement entities such as linear and angular dimensions are represented in the radiographic image using graphical mark-up. Dimensions include dimension text, dimension lines, extension lines, and arrowheads. Type and appearance of dimensions may be customised to user preferences.

Measurement values may be displayed either discretely or continuously in the measurement values window as the user moves the position of a point over the image.

In the discrete mode, the values are updated after user control is released (e.g. the user stops dragging the mouse cursor and releases the mouse button when he/she believes the measurement point is well located in the image).

In the continuous mode, the values are adapted continuously during moving the measurement point in the image. This mode has the advantage that the abnormality alerting mechanism, described in the sequel, is continuously calculating whether some measurands are outside their normal range in response to repeatedly moving the measurement point around.

When a measurand is on the threshold of abnormality, the abnormality signal will start toggling, alerting the physician that care must be exercised, and more confidence will be gained in the outcome of the measurement when finally the mouse cursor control is released on a considered position in the image.

Measurement results have some inherent uncertainty because the measured result is only an estimate of the "true" or "correct" value. To establish this relationship between the measurement and the true value of the measurand, the contributors to uncertainty in the measurement are established. In most cases a measurand Y is not measured directly, but is determined from a number N of other quantities $X_1$, $X_2 \ldots X_N$ through a functional relationship f: $Y=f(X_1, X_2 \ldots X_N)$. The input quantities $X_1, X_2 \ldots X_N$ upon which the output quantity Y depends may themselves be viewed as measurands and may in turn depend on other quantities as expressed by the measurement dependency graph. In the context of the present invention, the measurands and depending measurands are based on the determination of points in the image, and therefore, the measurement uncertainty will be a complex relationship f of the uncertainty in pixel location. An estimate of the measurand Y, denoted by y, is obtained from the functional relationship f using input estimates $x_1, x_2 \ldots x_N$ for the values of the N quantities $X_1$, $X_2 \ldots X_N$. Thus the output estimate y, which is the result of the measurement, is given by $y=f(x_1, x_2 \ldots x_N)$. Each input estimate $x_i$ and its associated standard uncertainty $u(x_i)$ are obtained from a distribution of possible values of the input quantity $X_i$. This probability distribution may be either frequency based, that is, obtained from a series of k observations of $X_i$, or it may an a priory distribution. These types are referred to as Type A or Type B evaluations of standard uncertainty respectively. For example, assuming a linear resolution $\delta x$ of the image, the value of a pixel determination process that produces a given location X can lie with equal probability anywhere in the interval $X-\delta x$ to $X+\delta x$ and the process is described by a rectangular probability distribution of width $\delta x$ with variance $u^2=(\delta x)^2/12$ implying a standard uncertainty of $u=0.29\delta x$ for the linear position of any pixel in the image (referred to as Type B evaluation of standard uncertainty). The standard uncertainty of y, where y is the estimate of the measurand Y and thus the result of the measurement, is obtained by appropriately combining the standard uncertainties of the input estimates $x_1, x_2 \ldots x_N$. This process is called error propagation.

The square of the combined uncertainty $u_c(y)$ for independently assumed input quantities and sufficient linearity of f at the $x_i$ is given by $$u_c^2(y) = \sum_{i=1}^{N} \left(\frac{\partial f}{\partial x_i}\right)^2 u^2(x_i),$$

the partial derivatives to $X_i$ being evaluated at $x_i$ called the sensitivity coefficients. For correlated input quantities, the expression for the combined variance $$u_c^2(y)$$

associated with the result of a measurement is $$u_c^2(y) = \sum_{i=1}^{N}\sum_{j=1}^{N} \frac{\partial f}{\partial x_i}\frac{\partial f}{\partial x_j} u(x_i, x_j) = \sum_{i=1}^{N}\sum_{j=1}^{N} \frac{\partial f}{\partial x_i}\frac{\partial f}{\partial x_j} u(x_i)u(x_j)r(x_i, x_j),$$

with $u(x_i,x_j)=u(x_i)u(x_j)r(x_i,x_j)$ the estimated covariance associated with $x_i$ and $x_j$ and the degree of correlation between $x_i$ and $x_j$ characterised by the estimated correlation coefficient $r(x_i,x_j)$. Although $u_c(y)$ can universally be used to express the uncertainty of a measurement result, in the context of a medical application, a measure of uncertainty is given that may be expected to encompass a large fraction of the distribution of values that could reasonably be attributed to the measurand. The expanded uncertainty denoted by U is computed by multiplying the combined standard uncertainty $u_c(y)$ by a coverage factor k: $U=ku_c(y)$ and the result of the measurement is expressed in the measurement values window as $Y=y\pm U$. Usually, k is set to 2, meaning the uncertainty is denoted at a 95% (2SD) confidence level.

The uncertainty bounds of a measurand may also be depicted graphically in the image by additional lines drawn at either side of the measurement mark-up line of the measured quantity in its associated graphical layer.

Retrieval of normal values and comparison with measurement values After selection of a measurement scheme from the measurement stencil repository, the associated normal values table for the measurement scheme is retrieved from the normal values repository.

When a measurement entity node of the measurement scheme is visited in the measurement dependency graph, the medical nomenclature of the measurement entity and patient-specific data (such as gender, age, length . . . ) are used as a selector in the normative values table of the measurement scheme.

The normative value, and the associated comparison function are retrieved from the normative values table, after which measurement value and normative value are compared.

An abnormality signalling function alerts the physician should the measurement value lie outside the normal range. This functionality is instantaneous, that is, normality or abnormality of a measurand is signalled immediately when the result of the measurement value computation is known. This ability is impossible in the prior art, where the measurement value needs be looked up afterwards in the proper atlas.

Normal values and other numeric information useful for measurements in radiology are calculated and presented in many different ways, for example as a fixed cut-off value.

EXAMPLES any value of the angle of the epiphyseal axis with the cylindrical bone axis different from 0° may be indicative of a metaphyseal fracture a metacarpal II index (which is 100 times the sum of cortical thickness divided by width) smaller than 44 may be indicative of osteoporosis a demographic and patient data-specific cut-off value. This case differs from the previous one in that the cut-off or threshold value is made dependent on e.g. the age and gender of the patient, ethic race, body weight, height, body surface etc. Hence, the cut-off value is a function of one or more variables, which may be stored in discrete form by sampling the function at suitable intervals. The electronic calculation re-samples the interpolated function to retrieve the final threshold.

a normative value presented with statistical upper and lower limits, these limits being defined as the mean value plus or minus a number of standard deviations (SD). This latter tolerance range is normally equal to −2SD to +2SD, and means that about 2% of a normal population will be assessed as abnormally large and around 2% as abnormally small with respect to the parameter assessed. As with the foregoing case, the tolerance range may be function of a number of variables.

a threshold based on a multiple of the standard deviation, the SD being calculated on the basis of the deviation with respect to an ideal fitted geometric object (fit line, fit parabola, fit circle, fitted ellipse etc.) Example: vertebral displacements due to dislocations and diagnosed by means of the perpendicular distance of anatomical landmarks with respect to an analytic curve fitted through corresponding anatomical landmarks of a sequence of vertebrae.

a nomogram (or nomograph), which is a graph containing several (usually three) parallel scales graduated for different variables so that when a straight line connects values of any two, the related value may be read directly from the third at a point intersected by the line. It assists in estimating data that normally would require intricate calculations. For example, carpal length relationships are usually determined by a nomogram, where the grade of deviance from the mean for a specific child is established by placing a ruler between the two points on the scales that correspond to specific measures in the hand radiograph of the children. The electronic implementation stores the axes in discrete form. To retrieve the grade of deviance, the position along the axis is interpolated from the value of the known input variables, followed by an emulation of the graphical construction to retrieve the requested deviance given the input variables.

The measurement template provides a coupling between an individual entity and its normative value through a link to a record in a normative reference database.

The normative reference database is organised around tables, grouping mean value and standard deviations for each measurement scheme in one table.

Tables may further be organised hierarchically according to a whole-part relationship (e.g. a normative table for spinal measurements may be composed of tables for the individual vertebrae). The link may be through the generally accepted medical name for the anatomical quantity or it may be based on a unique identifier when the quantity is referred to by a plurality of names according to different translations or user preferences.

Just as measurement values and their uncertainty bounds are displayed graphically, the normal values may be depicted by suitable graphical mark-up as well. For example, along with the actual measurement value, the mean value and the two-sigma range of an angle for the normal population may be depicted in the image with three additional lines. Referencing may be either centrally, or with respect to one of the constituent measurement objects (that is with respect to one of the points in a point pair for distance measurements, or with respect to one of the lines in a line pair for angle measurements). This representation enables the clinician to graphically assess the actual measurement value in relationship to the average population. To avoid confusing superposition of too many lines in the radiographic image, all graphical mark-up pertaining to a particular measurand may be grouped in a separate layer, the display of which may be switched on and off on user's request.

Reporting and Saving the Results of a Measurement Session

Analogous to graphical and numerical input to a measurement session, both numerical and graphical results may be reported and saved. Measurement results and their applicable normal values are stored in the patient dossier in a suitable data format (such as XML). Furthermore, the graphic representation of a measurement session is saved as well in a suitable graphic format (such as SVG), and it is linked with the image, so that it may be redrawn onto the image at future referral.

Alternatively, the actualised graphics may be stored as a template, to be used in new measurement sessions during follow-up of a patient for example.

General System Overview

A general overview of the measurement system is shown in FIG. 1. From a software functionality viewpoint, the system comprises an engine and a user interface.

The engine (E) guides the measurements that are performed on the retrieved (3) and displayed (4) radiological image by performing a generic execution of a measurement template.

It loads and activates a selected measurement template from a stored database (1) by (a) loading the measurement dependency graph into memory, (b) displaying (18) the graphical part of the measurement template, (c) registering all available methods specified by each measurement entity or object (both 'external' and 'internal' methods associated with the graphical part and the graph node part respectively). It starts execution of the measurements at the topmost measurement entity as specified by the measurement template or as selected by the user, and traverses the measurement dependency graph while chaining the nodes along its path.

When a leave node associated with a user-defined measurement point fires, the engine controls the graphical mapping (5) of the point in the image. To this purpose, the engine (a) passes control to the user interface when the point mapping is performed by the user who drags (6) the measurement objects onto an image position in accordance with the template after which the point's position is passed (7) to the measurement calculation module, or (b) initiates appropriate region of interest processing (e.g. contrast enhancement, geometric manipulation such as zooming, or feature-specific filtering to enhance the desired anatomical landmarks), or (c) performs the deformable contour-based segmentation for active measurement templates, in which case the position of the measurement points is established in spatial relationship to said contours and which positions are passed (7) to the measurement calculation module. The initial position of the deformable contours may be determined using a small number of mapped anchor points (6). When an internal node of the graph fires (which is either a measurement object node or a measurement operator node), the measurement computation module (A) computes the values of parameters of the node based on the values of the depending nodes. For example, the computation of the intersection point of two lines falls under this category. When the node is a measurement operator, the value of the measurement is computed and the measurement result is depicted graphically onto the radiological image (8).

In a specific embodiment the engine further controls selection (9) and addressing (10) of normative values in a normative values table by a selection module (B), which normative values table is retrieved from a normal values repository (2). Both normative value (11) and actual measurement (12) are supplied to an abnormality judgement device (C), which calculates the presence and degree of abnormality of the measurement value. The deviation from normality may be depicted graphically in the radiological image (13). The measurement results (14) and their degree of abnormality (15) is updated in a spreadsheet and clinical database. All graphical results of the measurement session are saved along with the image (16).

The user interface (D) basically consists of a database, a controller and a graphics part.

All graphical objects to be drawn in the image such as measurement objects (e.g. points, lines, circles . . . ) and graphical measurement mark-up (e.g. distance and angle double-side arrow line segments) are generated and stored in a database created and maintained at run-time.

The controller reacts to events such as the user pressing a mouse button or running a dialog box, starting a command, addition of an object to the database, notification and modification of objects that other objects onto which they are based have changed etc.

The user interface's responsibility is to render all measurement entities and measurement results.

In particular it renders the measurement template in the template window (18), and changes appearance of entities in it in the course of the measurement procedure e.g. to hint the user to the next point to map.

It generates or updates the graphical representation of all objects currently in the database, and superimposes it onto the display of the image in the image window (4).

It further renders and updates the measurement values in the measurement values window (17).

In a specific embodiment, normative values are displayed (20) in the measurement values window, along with the result of comparison of measurement values with their respective normative values (19).

From the software architecture viewpoint, the system is organised into layers.

The system software layer, the bottom layer, contains components such as operating systems, databases, interfaces to specific hardware and so on.

The middle-ware layer contains components such as GUI builders, interfaces to database management systems, platform-independent operating system services, and ActiveX-components such as spreadsheets and diagram editors.

The business-specific layer, contains business specific components used in several applications. For example, a library of calculations on geometric objects falls into this layer.

The application layer, the top layer, contains the application specific services.

What is claimed is:

1. A method of performing geometric measurements on a radiological image comprising the steps of
    acquiring a digital image representation of said radiological image,
    applying said digital image representation to a display device connected to a computer and displaying said image,
    activating a measurement scheme that has been stored in said computer, said measurement scheme comprising a graphical part representing a relation between measurement entities and anatomy present in said radiological image and an internal part representing functional dependencies between said measurement entities; said graphical part and said internal part being bi-directionally linked,
    performing measurements on said displayed image, said measurements being guided by the activated measurement scheme.

2. A method according to claim 1 wherein said measurements are performed by displaying said graphical part of said measurement scheme and by mapping measurement objects of the displayed graphical part onto a corresponding location in said displayed radiological image and by entering the corresponding location into the activated measurement scheme.

3. A method according to claim 1 wherein said measurement scheme is selected from a measurement scheme repository comprising a number of measurement schemes adapted to different examination types and/or different radiological exposure conditions.

4. A method according to claim 1 wherein said measurement scheme is a passive measurement scheme.

5. A method according to claim 2 wherein constituent points of measurement objects are placed manually in said image.

6. A method according to claim 2 wherein constituent points of measurement objects are placed by the steps of magnifying a region of interest surrounding the location of said constituent point in said image and/or in said measurement scheme and by manually placing said points in said image.

7. A method according to claim 2 wherein values of measurands are computed by applying measurement operators onto geometric locations of measurement objects.

8. A method according to claim 1 wherein said measurement scheme is an active measurement scheme.

9. A method according to claim 1 wherein said graphical part is displayed as an overlay on top of the body part to be examined on said displayed image.

10. A method according to claim 1 wherein said measurement scheme comprises normative values for measured entities and wherein upon activation of said measurement scheme said normative values are retrieved and compared with corresponding measured entities so as to assess a degree of abnormality.

11. A method according to claim 1 wherein calibration factors are calculated for measurements based upon the image of a calibration device which is exposed simultaneously and under identical exposure conditions as the object to which said radiological image pertains, and wherein the measurements performed on said displayed image are corrected by means of said calibration factors.

12. A method according to claim 1 wherein uncertainty values are calculated by error propagation of measurements and calculations guided by said measurement scheme.

13. A method according to claim 1 wherein at least one of said calibrated values, uncertainty values, normative values and degrees of abnormality are visualised.

14. A computer program product adapted to carry out the steps of claim 1 when run on a computer.

15. A computer readable carrier medium comprising computer executable program code adapted to carry out the steps of claim 1.

* * * * *